US012043354B2

(12) United States Patent
Sullivan et al.

(10) Patent No.: US 12,043,354 B2
(45) Date of Patent: Jul. 23, 2024

(54) TOWED ARRAY BALLASTING UNIT

(71) Applicant: Naval Information Warfare Center Pacific, San Diego, CA (US)

(72) Inventors: Peter Sullivan, Encinitas, CA (US); W Wayne Husband, III, San Diego, CA (US); Kelly Moorleghem, Poway, CA (US); Frank Chang, La Mesa, CA (US); Brian Granger, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 423 days.

(21) Appl. No.: 17/582,247

(22) Filed: Jan. 24, 2022

(65) Prior Publication Data
US 2023/0234680 A1    Jul. 27, 2023

(51) Int. Cl.
*B63B 39/00* (2006.01)
*B63B 79/15* (2020.01)
*B63B 79/40* (2020.01)
*G01V 1/38* (2006.01)

(52) U.S. Cl.
CPC .............. *B63B 39/00* (2013.01); *B63B 79/15* (2020.01); *B63B 79/40* (2020.01); *G01V 1/3826* (2013.01)

(58) Field of Classification Search
CPC .................................. B63B 39/00; B63G 8/14
See application file for complete search history.

(56) References Cited

U.S. PATENT DOCUMENTS

| | | | | |
|---|---|---|---|---|
| 3,343,511 A | * | 9/1967 | Hinton | B63G 8/26 114/330 |
| 4,745,583 A | * | 5/1988 | Motal | G01V 1/3826 367/16 |
| 7,987,805 B1 | * | 8/2011 | Buescher | B63G 8/14 114/330 |
| 8,047,154 B1 | * | 11/2011 | Buescher | B63G 8/42 114/330 |
| 8,136,470 B1 | * | 3/2012 | Buescher | B63G 8/14 114/330 |
| 10,144,493 B2 | * | 12/2018 | Edwards | B63B 17/00 |
| 11,498,436 B2 | * | 11/2022 | Bloomstein | H01M 8/04186 |

(Continued)

OTHER PUBLICATIONS

3rd party disclsoure to contractor; See IDS cover letter.

*Primary Examiner* — S. Joseph Morano
*Assistant Examiner* — Jovon E Hayes
(74) *Attorney, Agent, or Firm* — Naval Information Warfare Center Pacific; Kyle Eppele; Matthew D. Pangallo

(57) ABSTRACT

A towed array ballasting unit includes a canister, an internal bladder, an external bladder, a motor valve, fluid, a shroud, and printed circuit boards. The canister includes a head endcap and an aft endcap with the internal bladder located within and attached to an internal end of a fluid channel. An external bladder is located outside the canister and attached to an external end of the fluid channel. The motor valve is attached to the aft endcap of the canister and the internal end of fluid channel. The fluid moves between the internal bladder and external bladder via the fluid channel. The shroud forms a shell around the canister, external bladder, and a connector that connects the towed array ballasting system to an array tail. The printed circuit boards execute instructions provided by a computer.

20 Claims, 8 Drawing Sheets

(56) References Cited

U.S. PATENT DOCUMENTS

2007/0135974 A1\* 6/2007 Fielding ............... G01V 1/3826
                                                                                     367/106
2007/0229083 A1\* 10/2007 Tenghamn ............... G01V 3/12
                                                                                     324/347

\* cited by examiner

TOWED ARRAY BALLASTING UNIT

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND

There is a variety of towed sensor arrays used by vehicles (e.g., ships, unmanned underwater vehicles, submarines, etc.) or attached to a buoy for military and commercial purposes. In order to limit array drag during towing and optimize platform performance, arrays are typically in a horizontal orientation (i.e., neutrally buoyant) in the water. For data collection by the sensor arrays, a vertical orientation may be needed. This change in orientation can be accomplish in two ways, by shifting the center of buoyancy to one end of the system or by changing the volume of the system effectively changing system buoyant force.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

In towed array ballasting units, previous methods shift the center of buoyancy to change the orientation of the sensor array by pumping a heavy fluid between reservoirs at the head and tail of the array. When fluid is at the head of the unit, the tail end of the array becomes buoyant and floats to a vertical position in the water column. Conventional towed array ballasting units include an entire array with a hose filled with heavy fluid and bladders positioned at either end of the encapsulated array. These units are inefficient and have mechanical complexity. As a result, there are many points of failure.

In the towed array ballasting unit herein, the passive hydrostatic energy of the ocean is utilized. The towed array ballasting unit also uses compressed gas pressure to change the volume of the modular unit at the tail of the array to change the orientation of the array to a vertical position. Since the towed array ballasting unit herein uses passive hydrostatic energy and compressed gas, the unit is more efficient and less complex with fewer mechanical parts when compared to conventional towed array ballasting units.

The towed array ballasting unit herein includes a canister, an internal bladder, an external bladder, a motor valve, fluid, a shroud, and printed circuit boards. The canister includes a head endcap and an aft endcap with the internal bladder located within and attached to an internal end of a fluid channel. An external bladder is located outside the canister and attached to an external end of the fluid channel. The motor valve is attached to the aft endcap of the canister and the internal end of fluid channel. The motor valve opens and closes the fluid channel to allow fluid to move from either the external bladder or the internal bladder. The fluid moves between the internal bladder and external bladder via the fluid channel. The shroud forms a shell around the canister, external bladder, and a connector that connects the towed array ballasting system to an array tail. The printed circuit boards execute instructions provided by a computer.

Figure 1:
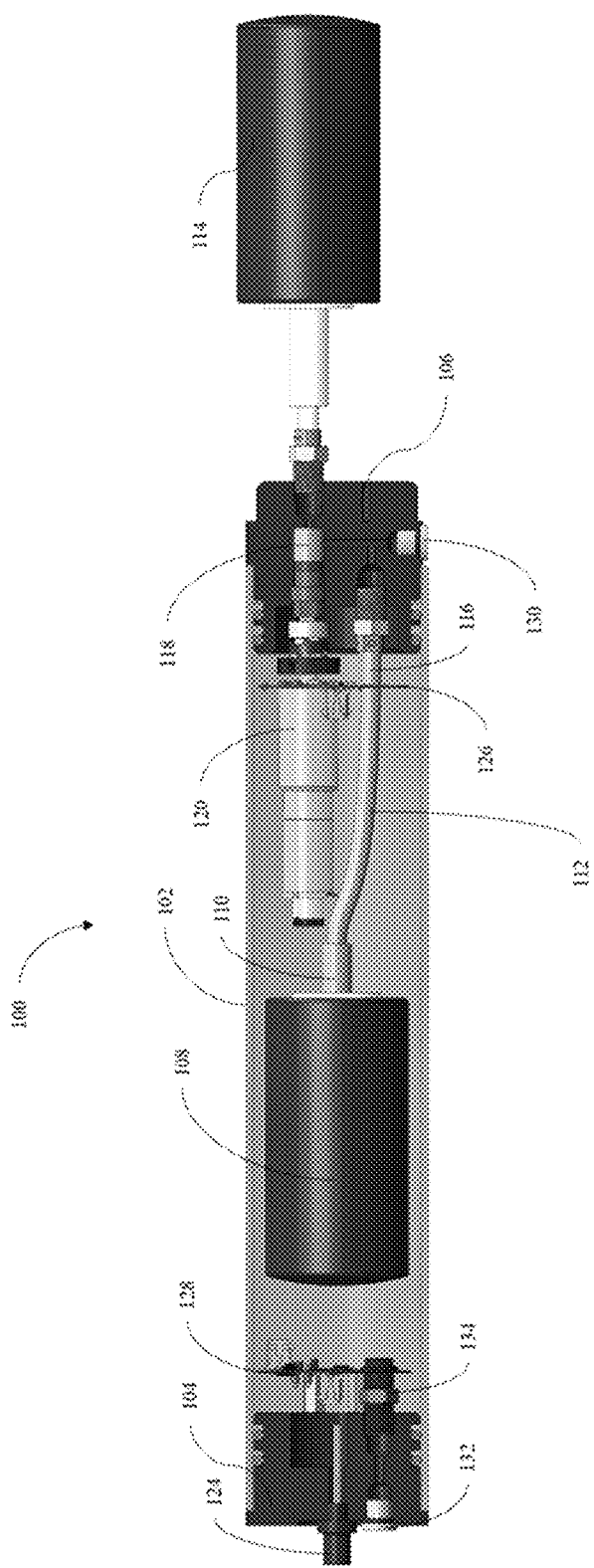
FIG. 1 is an example of a cross-sectional view of the towed array ballasting unit herein.

Referring now to FIG. 1, the towed array ballasting unit 100 includes a canister 102 with a head endcap 104 and an aft endcap 106. The canister 102 encloses and protects other components of the towed array ballasting unit 100 discussed in further detail herein. The canister 102 also has a connector 124 that is an electrical and mechanical interface to an array 204. The connector 124 mechanically connects to the array tail of the array 204 (shown in FIG. 2-4) as well as the electrically connecting the array tail to the towed array ballasting unit 100. The canister 102 may be composed of any material that can withstand an external pressure of equal to or less than 1500 psi and an internal pressure equal to or less than 100 psi. Some specific examples that the canister may be composed of include a metal, such as aluminum or steel, carbon fiber, fiberglass plastic, or a combination thereof. In some examples, the head endcap 104 and the aft endcap 106 may be composed of the same material as the canister 102 or a different material as the canister 102. For example, the canister 102 may be a metal, and the head endcap 104 and aft endcap 106 may be a fiberglass plastic.

Referring back to FIG. 1, the towed array ballasting unit 100 includes an internal bladder 108 located within the canister 102 and attached to an internal end 110 of the fluid channel 112. The internal bladder 108 fills with fluid when in a towed configuration (shown in FIG. 4) and empties the fluid in a collect configuration (shown in FIG. 3). In an example, the internal bladder 108 that can withstand an external pressure of equal to or less than 100 psi. In addition, the internal bladder 108 may have an internal volume ranging from about 10 cm$^3$ to about 130 cm$^3$. In an example, the internal bladder 108 may be composed of any material that is corrosion resistant to an ocean environment and resistant to UV radiation. Some examples that the internal bladder 108 may be composed of include rubber, high tensile strength fabric coated in rubber, fiber reinforced plastic, and combinations thereof.

Referring back to FIG. 1, the towed array ballasting unit 100 includes an external bladder 114 located outside the canister 102 and attached to an external end 116 of the fluid channel 112. The external bladder 114 fills with fluid when in collect configuration (shown in FIG. 3) and empties the fluid in a towed configuration (shown in FIG. 4). In an example, the external bladder 114 that can withstand the external pressure of equal to or less than 100 psi. In addition, the external bladder 114 may have an internal volume ranging from about 10 cm$^3$ to about 130 cm$^3$. In an example, the external bladder 114 may be composed of any material that is corrosion resistant to an ocean environment and resistant to UV radiation. Some examples that the external bladder 114 may be composed of include rubber, high tensile strength fabric coated in rubber, fiber reinforced plastic, and combinations thereof. In some examples, the internal bladder 108 and the external bladder 114 may be composed of the same material. In other examples, the internal bladder 108 and the external bladder 114 may be composed of different materials.

Referring back to FIG. 1, the towed array ballasting unit 100 includes a motor valve 118 where the motor valve 118 attaches to the aft endcap 106 of the canister 102 and attaches to the fluid channel 112 where the motor valve 118 opens and closes the fluid channel 112 to allow fluid to move from either the external bladder 114 or the internal bladder 108. In the example in FIG. 1, the motor valve 118 opens and closes using an electric motor 120. In an example, the motor valve 118 may be selected from the group consisting of an on/off valve, a needle valve, or a solenoid valve.

The fluid moves between the internal and external bladder via the fluid channel 112, which causes the towed array ballasting unit 100 to reorient itself based on which bladder 108, 114 the fluid is located in. The fluid may be any fluid that is non-corrosive and incompressible. Some examples of the fluid include a hydraulic fluid or silicone oil.

Referring back to FIG. 1, the towed array ballasting unit 100 includes printed circuit boards 126, 128, where the printed circuit boards execute the instructions programmed on microcontrollers on each printed circuit board 126, 128. In the example in FIG. 1, two printed circuit boards 126, 128 are used. However, the towed array ballasting unit 100 may have one or more printed circuit boards depending on the application. In the example in FIG. 1, one printed circuit board 126 is the motor controller. This printed circuit board 126 turns the electric motor 120 on and off to open and close the motor valve 118. The other printed circuit board 128 is the power conditioner that controls the interface to the array system managing communication and monitors internal bottle temperature, pressure, and orientation using several other integrated circuit package sensors. Each printed circuit board 126, 128 includes microcontrollers with software that allows each printed circuit board 126, 128 to perform their respective functions. A host computer is used that is located on the mobile platform, another ship, or land that can be used to communicate with the towed array ballasting unit 100. The computer may be any computer that can communicate with electronics in the towed array ballasting unit 100 (e.g., the printed circuit boards 126, 128, other onboard electronic components, etc.) to instruct the printed circuit boards 126, 128 to execute their respective functions, such as controlling the power, inputs and electric motor 120 for the towed array ballasting unit 100.

Figure 2:
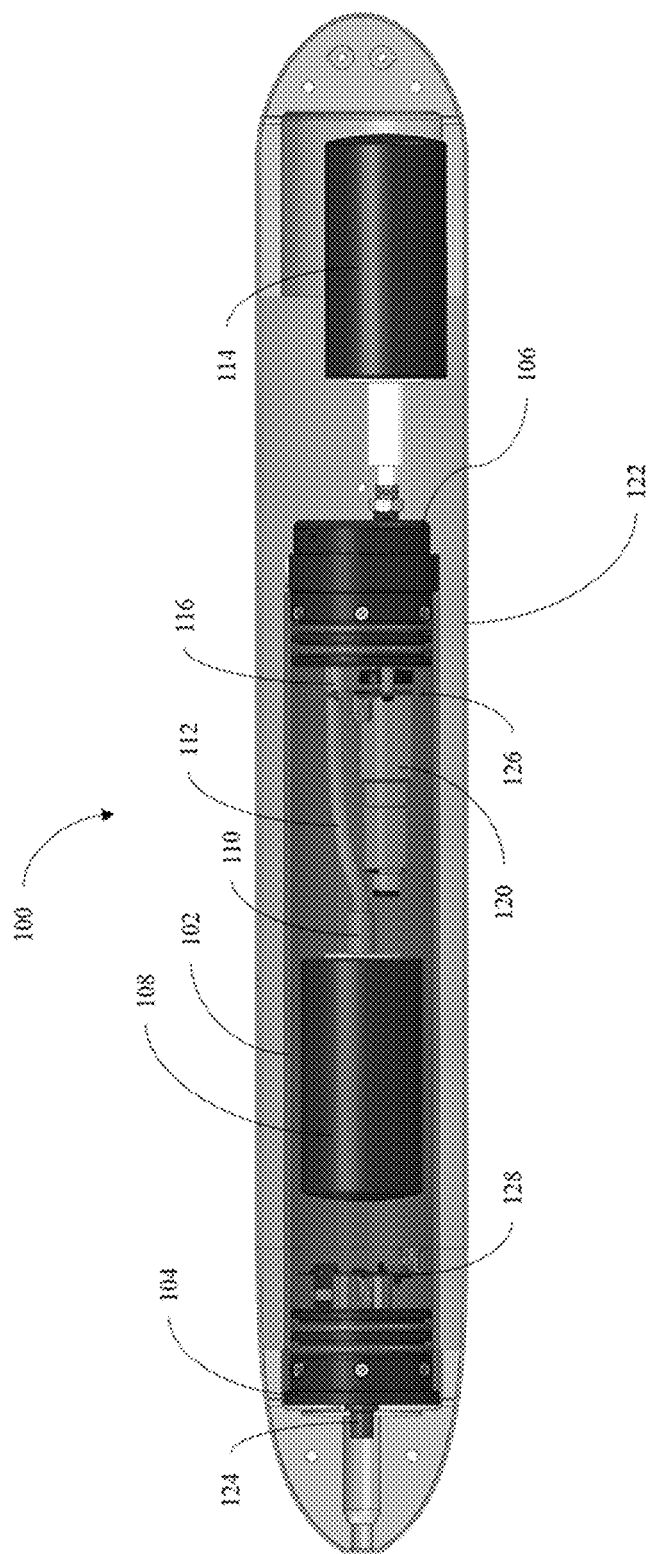
FIG. 2 is an example of a cross-sectional view of the towed array ballasting unit herein with a visible shroud.

Referring now to FIG. 2, the towed array ballasting unit 100 includes a shroud 122 that forms a shell around the canister 102, external bladder 114, and the connector 124 that connects the towed array ballasting unit 100 to an array tail (not shown in FIG. 2). The shroud 122 acts to protect the towed array ballasting unit 100 during operation and to provide for added buoyancy and center of buoyancy adjustments of the towed array ballasting unit 100. The towed array ballasting unit 100 is the same towed array ballasting unit 100 as previously disclosed herein.

Figure 4:
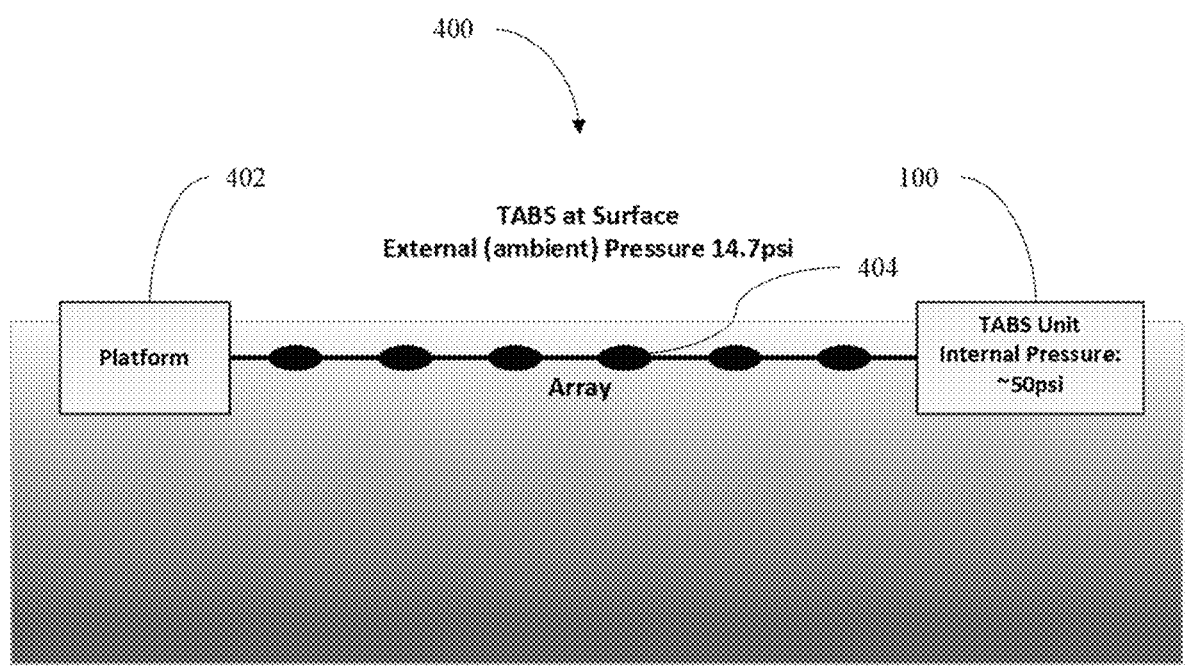
FIG. 4 is an example of the towed array ballasting unit being towed at the surface of a water body.
Figure 5:
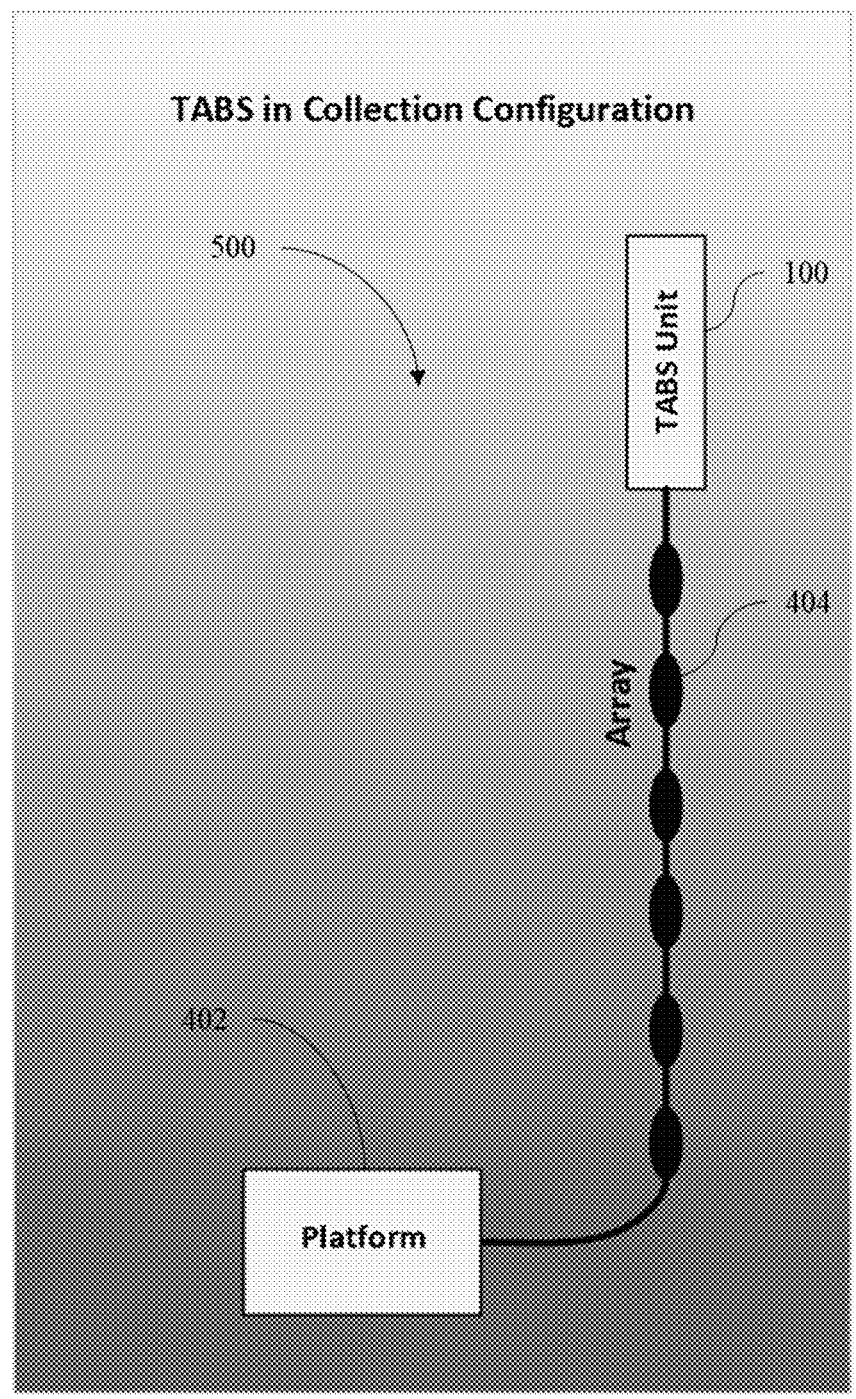
FIG. 5 is an example of the towed array ballasting unit in a collect configuration in a water body with fluid in the external bladder, thereby making the unit buoyant.
Figure 6:
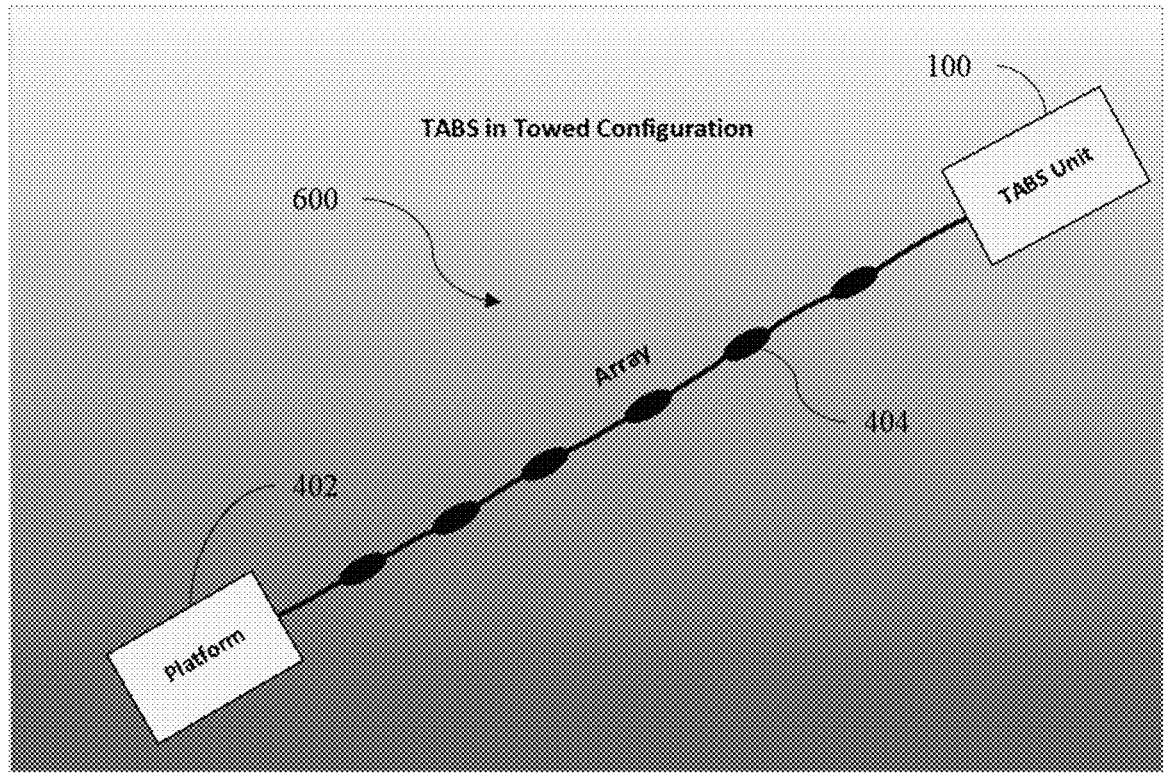
FIG. 6 is an example of the towed array ballasting unit in a towed configuration in a water body with fluid in the internal bladder with the motor valve closed.

As previously mentioned herein, the connector 124 is an electrical connector that connects to the array tail of an array 204 (shown in FIG. 4-6). The array 404 connects the towed array ballasting unit 100 to a mobile platform 402. Some examples of the mobile platform include a ship, a buoy, an unmanned underwater vehicle, or a submarine. In an example, the array tail is part of an array 404 consisting of a towed passive acoustic hydrophone array. In other examples, the array tail is part of any cable-based system that needs to change orientation, such as a seismic array or a magnetometer array.

Figure 3:
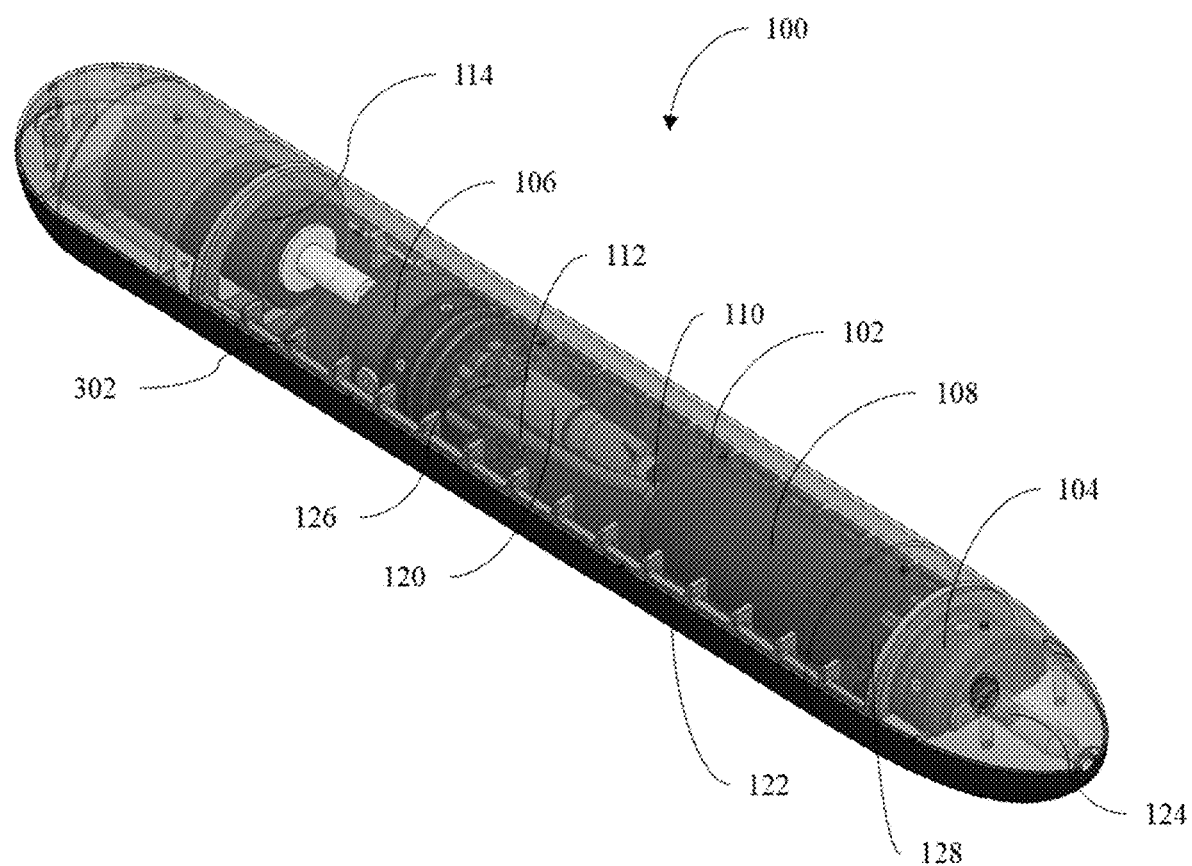
FIG. 3 is an example of a cross-sectional view of the towed array ballasting unit herein with a visible shroud including inner foam ribs.

Referring to FIG. 3, in some examples, the towed array ballasting unit 100 includes the shroud 122 with inner foam ribs 302 to adjust for overall buoyancy and pitch. In this example, the foam ribs 302 span from the aft endcap 106 to the head endcap 104. one or more inner foam ribs 302 may be used. The amount and size of the inner foam ribs 302 may vary depending on the application of the towed array ballasting unit 100.

Referring to FIG. 4, an example of the towed array ballasting unit 100 being towed on the surface 400 is shown. The mobile platform 402 is attached to an array 404, which is connected to the towed array ballasting unit 100. At the surface, the motor valve 118 is actuated. The pressure differential is used to push fluid from the internal bladder 108 into the external bladder 114 exposed to ambient pressure (~14.7 psi at the surface). In some examples, data can be collected on the surface 400 by the towed array ballasting unit 100. In other examples, no data is being collected on the surface 400 by the towed array ballasting unit 100.

Referring to FIG. 5, an example of the towed array ballasting unit 100 in a collect configuration 500 is shown. The mobile platform 402 is attached to an array 404, which is connected to the towed array ballasting unit 100. In some examples, when the platform 402 and array 404 collect sensor data, the towed array ballasting unit 100 needs to change the orientation of the array 404. While the towed array ballasting unit 100 is on the surface, the operator commands the towed array ballasting unit 100 to open the motor valve 118. In this example, when the motor valve 118 is open the internal pressure of the canister (e.g., 52 psi) overcomes the ambient environmental pressure (e.g., 14.7 psi) and the fluid moves from the internal bladder 108 to the external bladder 114. In this example, the fluid transfer increases the volume of the towed array ballasting unit 100 by about 130 cm$^3$, which is about 133 grams of positive buoyant force pulling the array tail up into a vertical orientation.

In an example, when data collection is complete and operations require the platform 402 to resume transit through the water, the towed array ballasting unit 100 is signaled to return to neutral buoyancy. The platform 402 moves the towed array ballasting unit 100 to an ocean depth over 75 m, the motor valve 118 is opened and the hydrostatic pressure of the ocean overcomes the compressed air pressure in the canister 102. Fluid from the external bladder 114 moves to the internal bladder 108. After the fluid has moved into the internal bladder 108, the motor valve 118 is closed and the towed array ballasting unit 100 is in the neutrally buoyant state (i.e., a towed configuration).

Referring to FIG. 6, an example of the towed array ballasting unit 100 in a towed configuration 600 is shown. The mobile platform 402 is attached to an array 404, which is connected to the towed array ballasting unit 100. While being towed by a platform 402 the towed array ballasting unit 100 should be neutrally buoyant in the water allowing the array 404 to have smallest effective surface area lowering drag of the towed array ballasting unit 100 and improving platform 402 performance moving through the water. In the neutrally buoyant state, the external bladder 114 is empty, the internal bladder 108 is full of fluid, and the motor valve 118 is closed. In this example, the internal pressure of the towed array ballasting unit 100 may be about 52 psi. In some examples, data can be collected by the towed array ballasting unit 100 in a towed configuration 600. In other examples, no data is being collected by the towed array ballasting unit 100 in a towed configuration 600.

To further illustrate the present disclosure, examples are given herein. These examples are provided for illustrative purposes and are not to be construed as limiting the scope of the present disclosure.

Example

A test was conducted in a lab using a pressure chamber to evaluate the towed array ballasting unit's internal and external bladders. The internal chamber pressure of the towed array ballasting unit was set at 38 psi. The pressure chamber started at 15 psi while the towed array ballasting unit's valve was closed with the external bladder inflated and the internal bladder deflated (i.e., the towed array ballasting unit is buoyant). The chamber pressure in the towed array ballasting unit increased to 90 psi at while the valve was closed preventing fluid from moving between the internal and external bladders. Next, the valve was opened and the internal bladder inflated and the external bladder deflated. Once the internal bladder was fully inflated, the valve closed. This caused the chamber pressure of the towed array ballasting unit to decrease to 15 psi, which then caused the valve to open to inflate the external bladder and deflate the internal bladder. This cycle was repeated four times.

Figure 7:
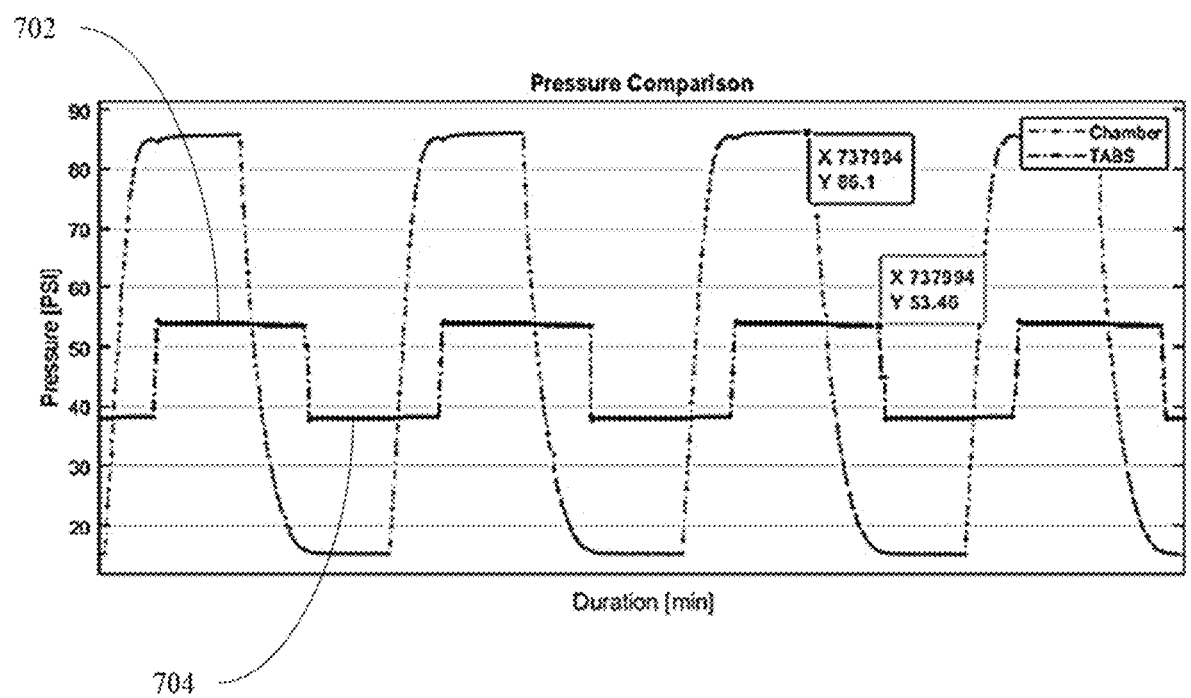
FIG. 7 is a plot of a pressure comparison between the towed array ballasting unit chamber and the external bladder showing the Duration (X-axis, labeled "Duration [min]") vs. Pressure (Y-axis, labeled "Pressure [PSI]")
Figure 8:
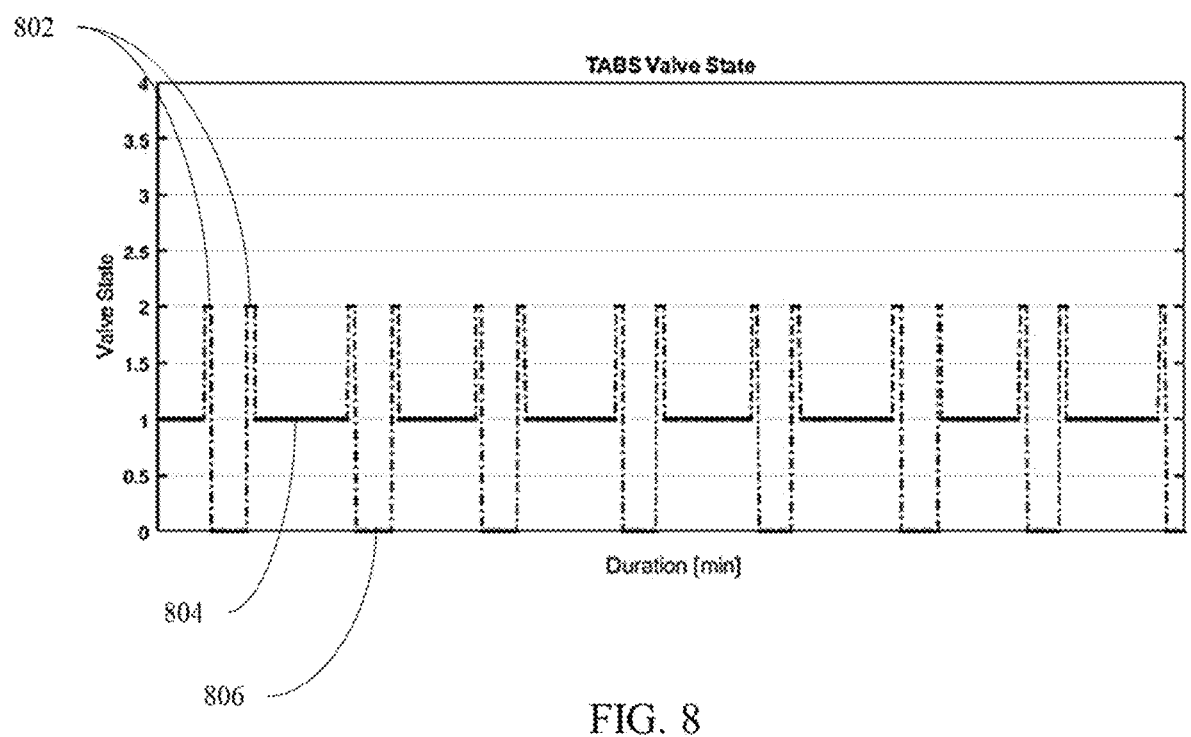
FIG. 8 is a plot of the towed array ballasting unit valve state showing the Duration (X-axis, labeled "Duration [min]") vs. Valve State (Y-axis, labeled "Valve State").

The results are shown in FIG. 7 and FIG. 8. In FIG. 7, a pressure comparison between towed array ballasting unit chamber and the external bladder is shown. At 702, the internal bladder was inflated and the external bladder was deflated making the towed array ballasting unit heavy. At 704, the external bladder was inflated and the internal bladder was deflated, which makes the towed array ballasting unit buoyant. This cycle was repeated four times as previously described. In FIG. 8, the valve state is shown during the same duration as FIG. 7. At 802, the valve was in transition, at 804, the valve was closed, and at 806 the valve was open. Together FIG. 7 and FIG. 8 demonstrate that the towed array ballasting unit functioned as intended.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about 10 $cm^3$ to about 130 $cm^3$ should be interpreted to include not only the explicitly recited limits of from about 10 $cm^3$ to about 130 $cm^3$, but also to include individual values, such as 30 $cm^3$, 70 $cm^3$, 115 $cm^3$, etc., and sub-ranges, such as from about 50 $cm^3$ to about 75 $cm^3$, etc.

In describing and claiming the examples disclosed herein, the singular forms "a", "an", and "the" include plural referents unless the context clearly dictates otherwise.

What is claimed is:

1. A towed array ballasting unit, comprising:
   a canister, wherein the canister includes a head endcap and an aft endcap;
   an internal bladder, wherein the internal bladder is located within the canister and attached to an internal end of a fluid channel;
   an external bladder, wherein the external bladder is located outside the canister and attached to an external end of the fluid channel;
   a motor valve, wherein the motor valve attached to the aft endcap of the canister and attached to the fluid channel where the motor valve opens and closes the fluid channel to allow fluid to move from either the external bladder or the internal bladder;
   fluid, wherein the fluid moves between the internal bladder and external bladder via the fluid channel;
   a shroud, wherein the shroud forms a shell around the canister, external bladder, and a connector that connects the towed array ballasting unit to an array tail; and
   printed circuit boards, wherein the printed circuit boards execute the instructions provided by a computer.

2. The towed array ballasting unit of claim 1, wherein the canister can withstand an external pressure of equal to or less than 1500 psi and an internal pressure equal to or less than 100 psi.

3. The towed array ballasting unit of claim 1, wherein the canister is composed of aluminum, carbon fiber, steel, fiberglass, plastic, or a combination thereof.

4. The towed array ballasting unit of claim 1, wherein the internal bladder can withstand the external pressure of equal to or less than 100 psi.

5. The towed array ballasting unit of claim 1, wherein the external bladder can withstand the external pressure of equal to or less than 100 psi.

6. The towed array ballasting unit of claim 1, wherein the internal bladder or external bladder has an internal volume ranging from about 10 $cm^3$ to about 130 $cm^3$.

7. The towed array ballasting unit of claim 1, wherein the internal bladder or external bladder is composed of rubber, fiber reinforced plastic, and combinations thereof.

8. The towed array ballasting unit of claim 1, wherein the fluid is a non-corrosive and incompressible.

9. The towed array ballasting unit of claim 1, wherein the motor valve includes a valve selected from the group consisting of an on/off valve, a needle valve, or a solenoid valve.

10. The towed array ballasting unit of claim 1, wherein the array tail is part of an array selected from the group consisting of a towed passive acoustic hydrophone array.

11. A towed array ballasting system, comprising:
- a canister, wherein the canister includes a head endcap and an aft endcap;
- an internal bladder, wherein the internal bladder is located within the canister and attached to an internal end of a fluid channel;
- an external bladder, wherein the external bladder is located outside the canister and attached to an external end of the fluid channel;
- a motor valve, wherein the motor valve attached to the aft endcap of the canister and attached to the fluid channel where the motor valve opens and closes the fluid channel to allow fluid to move from either the external bladder or the internal bladder;
- fluid, wherein the fluid moves between the internal bladder and external bladder via the fluid channel;
- a shroud, wherein the shroud forms a shell around the canister, external bladder, and a connector that connects the towed array ballasting system to an array tail; and
- printed circuit boards, wherein the printed circuit boards execute the instructions provided by a computer, wherein the computer is located on a surface of a water body and wirelessly connected to the printed circuit boards and includes software that controls power conditioning between the towed array ballasting system and an array and the motor valve by communicating with printed circuit boards.

12. The system of claim 11, wherein the canister can withstand an external pressure of equal to or less than 1500 psi and an internal pressure equal to or less than 100 psi.

13. The system of claim 11, wherein the canister is composed of aluminum, carbon fiber, carbon fiber, steel, fiberglass, plastic, or a combination thereof.

14. The system of claim 11, wherein the internal bladder is a rubber that can withstand the external pressure of equal to or less than 100 psi.

15. The system of claim 11, wherein the external bladder is a rubber that can withstand the external pressure of equal to or less than 100 psi.

16. The system of claim 11, wherein the internal volume of the internal bladder or external bladder ranges from about 10 $cm^3$ to about 130 $cm^3$.

17. The system of claim 11, wherein the internal bladder or external bladder is composed of rubber, fiber reinforced plastic, and combinations thereof.

18. The system of claim 11, wherein the fluid is a non-corrosive and incompressible.

19. The system of claim 11, wherein the motor valve includes a valve selected from the group consisting of an on/off valve, a needle valve, or a solenoid valve.

20. The system of claim 11, the array tail is part of an array selected from the group consisting of a towed passive acoustic hydrophone array.

* * * * *